(12) United States Patent
Li et al.

(10) Patent No.: US 8,029,157 B2
(45) Date of Patent: Oct. 4, 2011

(54) LIGHT REFRACTION ILLUMINATION DEVICE

(76) Inventors: William Li, Irvine, CA (US); Jack Li, Irvine, CA (US)

( * ) Notice: Subject to any disclaimer, the term of this patent is extended or adjusted under 35 U.S.C. 154(b) by 107 days.

(21) Appl. No.: 12/336,352

(22) Filed: Dec. 16, 2008

(65) Prior Publication Data
US 2009/0161360 A1 Jun. 25, 2009

Related U.S. Application Data

(60) Provisional application No. 61/009,026, filed on Dec. 21, 2007.

(51) Int. Cl.
*F21S 4/00* (2006.01)
*F21V 21/00* (2006.01)
(52) U.S. Cl. ............. 362/249.02; 362/245; 362/311.02; 362/331; 362/800
(58) Field of Classification Search .......... 362/235–237, 362/244–246, 249.01–249.02, 311.02, 311.06–311.1, 362/326, 331, 545, 800
See application file for complete search history.

(56) References Cited

U.S. PATENT DOCUMENTS

| | | | | |
|---|---|---|---|---|
| 4,254,453 A | * | 3/1981 | Mouyard et al. | 362/240 |
| 5,865,529 A | | 2/1999 | Yan | 362/327 |
| D425,223 S | | 5/2000 | Li | D26/28 |
| 6,170,971 B1 | * | 1/2001 | Godbillon | 362/543 |
| 7,083,299 B2 | | 8/2006 | Chapman | 362/188 |
| 7,153,000 B2 | | 12/2006 | Park et al. | 362/268 |
| D578,670 S | | 10/2008 | Li et al. | D26/1 |

* cited by examiner

*Primary Examiner* — Jason Moon Han
(74) *Attorney, Agent, or Firm* — Ladas & Parry, LLP

(57) ABSTRACT

In an embodiment, a light refraction illumination device is disclosed. The light refraction illumination device may comprise or include a support member, and a plurality of lenses associated with the support member, wherein each lens from among the plurality of lenses may comprise or include a plurality of concave surfaces. The light refraction illumination device may further comprise or include at least one light source associated with the support member, wherein the at least one light source is configured to emit light, and wherein the at least one light source is positioned relative to the plurality of lenses such that the light is configured to travel through the plurality of concave surfaces.

13 Claims, 6 Drawing Sheets

LIGHT REFRACTION ILLUMINATION DEVICE

CROSS REFERENCE TO RELATED APPLICATIONS

This application claims the benefit of U.S. Provisional Application No. 61/009,026, filed on Dec. 21, 2007, which is incorporated herein by reference in its entirety.

TECHNICAL FIELD

The present technology relates to the field of illumination devices.

BACKGROUND

Light sources have traditionally been used for such purposes as enabling vision in a dark environment and/or conveying information. Such light sources are generally configured to emit an amount of energy in the form of radiation such that the emitted radiation propagates within a detectable light spectrum, such as a spectrum of light that is visible to the human eye. Due in part to the importance of the communication of information in modern human societies, as well as the utility associated with the illumination of otherwise dark environments, individuals have strived to increase the efficacy and efficiency of a range of illumination devices that are adaptable for various lighting applications.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In an embodiment, a light refraction illumination device is disclosed. The light refraction illumination device may comprise or include a support member, and one to a plurality of lenses associated with the support member, wherein each lens from among the plurality of lenses may comprise or include one to a plurality of concave surfaces. The light refraction illumination device may further comprise or include at least one light source associated with the support member, wherein the at least one light source is configured to emit light, and wherein the at least one light source is positioned relative to the one to a plurality of lenses such that the light is configured to travel through the one to a plurality of concave surfaces.

Additionally, in one embodiment, a light refraction illumination device is disclosed, wherein the light refraction illumination device may comprise or include a support member, and one to an array of lenses associated with the support member, wherein any or each lens from among the one to an array of lenses may comprise or include a concave surface. The light refraction illumination device may further comprise or include one to an array of light sources associated with the support member, wherein the one to an array of light sources is configured to emit light, and wherein the one to an array of light sources is positioned relative to the one to an array of lenses such that the light is configured to travel through each concave surface.

Furthermore, in an embodiment, a light refraction illumination device is disclosed, wherein the light refraction illumination device may comprise or include a support member, and a light source associated with the support member, wherein the light source is configured to emit light along an axis of illumination. The light refraction illumination device may further comprise or include one to a plurality of lenses associated with the support member, wherein each lens from among the one to a plurality of lenses may comprise or include at least one light refracting surface such that one to a plurality of light refracting surfaces are associated with the one to a plurality of lenses, and wherein the one to a plurality of lenses are positioned along the axis of illumination such that the one to a plurality of lenses are configured to refract at least a portion of the light away from the axis of illumination in response to the light traveling through the one to a plurality of light refracting surfaces.

DESCRIPTION OF THE DRAWINGS

The accompanying drawings, which are incorporated in and form a part of this specification, illustrate embodiments of the present technology for a light refraction illumination device, and, together with the Detailed Description, serve to explain principles discussed below.

Figure 1B:
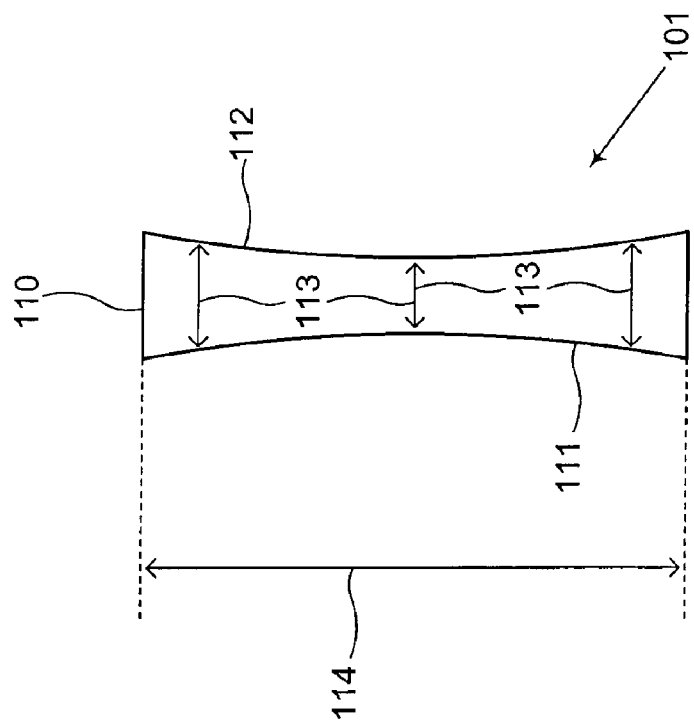
FIG. 1B is a cross-sectional diagram of a second exemplary configuration of a concave lens in accordance with an embodiment.

The drawings referred to in this description are not to be understood as being drawn to scale except if specifically noted. Additionally, it is noted that these drawings are exemplary in nature, and that the spirit and scope of the present technology is not limited to the exemplary embodiments presented in such drawings.

DETAILED DESCRIPTION

Reference will now be made in detail to embodiments of the present technology, examples of which are illustrated in the accompanying drawings. While the present technology will be described in conjunction with various embodiments, these embodiments are not intended to limit the present technology. Rather, the present technology is to be understood as encompassing obvious alternatives, modifications and equivalents, which may be included within the spirit and scope of the various embodiments as defined by the appended claims. Indeed, various exemplary embodiments, or aspects thereof, may be combined in accordance with the spirit and scope of the present technology.

Furthermore, in the following Detailed Description numerous specific details are set forth in order to provide a thorough understanding of the present technology. However, the present technology may be practiced without these specific details. In other instances, well-known methods, procedures, components, and circuits have not been described in detail so as to not unnecessarily obscure aspects of the exemplary embodiments presented herein. Moreover, for purposes of the following discussion, the term "linear" refers to a straight line, and the term "plurality" refers to two or more.

Overview

In an embodiment, a light source arrangement is provided that is configured to direct light from a light source such that the light is viewable at a greater angle away from an axial direction of illumination associated with the light source. For example, axial light rays are refracted outwards or away from the axial direction of illumination as the light rays travel through one or more concave lenses. In this manner, a wider beam pattern having a more even light distribution may be achieved, which serves to increase the viewability of such light with respect to a viewer who is not displaced along the aforementioned axial direction of illumination associated with the light source.

It is noted that various architectures and configurations may be implemented within the spirit and scope of the present technology. For example, in one embodiment, the light source arrangement includes one or more light sources, as well as one or more lenses. Indeed, pursuant to one exemplary implementation, the arrangement includes a plurality of different lenses included or contained in one or more lens arrays. Indeed, by utilizing multiple lens arrays that are each configured to refract an amount of light, the degree of refraction and the evenness of the light distribution within a beam pattern may be further increased or refined.

It is noted that in contrast to an exemplary configuration that utilizes a light reflecting device to reflect an amount of light so as to increase the width of a beam pattern associated with such light, an architecture in accordance with an embodiment includes at least one lens configured to refract an amount of light when such light travels through the lens, wherein the lens may include one or more concave lens surfaces. The degree of light refraction that is achievable using this light refracting lens is higher or more significant than the degree of light refraction that is achievable using a light reflecting device without a light refracting lens.

Moreover, it is noted that various types of light sources may be implemented within the spirit and scope of the present technology. To illustrate, an embodiment provides that one or more light sources of the aforementioned arrangement include a light emitting diode (LED). For example, LED-based lighting may be implemented due to its high efficiency, as measured by its light output per unit power input. Indeed, an exemplary scenario provides that LED-based lighting is more efficient than incandescent lighting, and is at least or more efficient than fluorescent lighting.

It is further noted that the present technology may be implemented in a wide range of applications. For example, the present technology may be utilized to increase the viewability of a safety or traffic light, or provide an efficient means of providing ambient lighting, such as further described herein. Indeed, in so much as an uneven light distribution within a generated beam pattern may be strenuous on a viewers eyes, such as when the viewer is utilizing the beam pattern to illuminate symbols or text that the viewer is attempting to interpret (e.g., during reading applications), it is noted that various embodiments of the present technology may be implemented so as to increase an even distribution of light within a beam pattern so as to alleviate or minimize the stress on a viewers eyes.

The foregoing notwithstanding, the spirit and scope of the present technology is not limited to these exemplary applications. Indeed, it is noted that the present technology may be utilized in a vast number of other applications.

Exemplary Architectures and Configurations

Various exemplary architectures and configurations for an illumination device will now be described. However, the present technology is not limited to the implementation of such exemplary architectures and configurations. Indeed, other architectures and configurations may be implemented within the spirit and scope of the present technology.

Figure 1A:
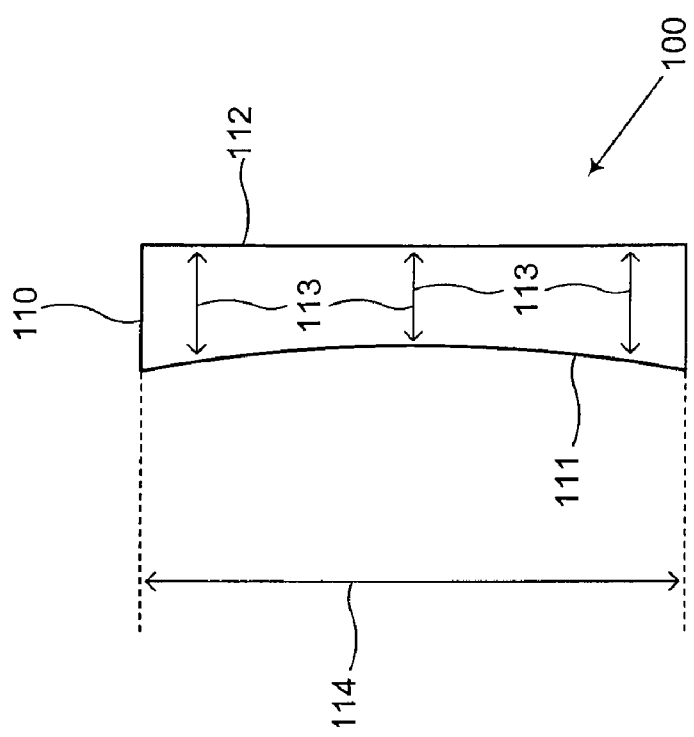
FIG. 1A is a cross-sectional diagram of a first exemplary configuration of a concave lens in accordance with an embodiment.

With reference now to FIG. 1A, a first exemplary configuration 100 of a concave lens 110 in accordance with an embodiment is shown. Concave lens 110 includes a plurality of lens surfaces, wherein an amount of light is able to pass through such lens surfaces. In particular, these lens surfaces include a concave surface 111, which is substantially concave in shape, as well as another surface 112, which is substantially linear in shape. In so much as the respective shapes of these lenses create or are otherwise associated with an uneven lens thickness distribution, an embodiment provides that a number of light rays or beams that travel through these lens surfaces will be refracted such that the direction of propagation of such beams is altered.

To further illustrate, and in accordance with an embodiment, concave surface 111 and another surface 112 are located at generally opposite sides of concave lens 110. Moreover, in so much as concave surface 111 is substantially non-linear, and in so much as another surface 112 is substantially linear, concave lens 110 is characterized as having widths (represented by arrows 113) of different lengths at different positions along a length (represented by arrow 114) of concave lens 110. For purposes of illustration, it is noted that these widths are normal or perpendicular to the length of concave lens 110. In this manner, an uneven lens thickness distribution is associated with concave lens 110 based on the different lengths or magnitudes associated with these different widths. Furthermore, an embodiment provides that this uneven lens thickness distribution enables concave lens 110 to refract an amount of light, such as described above.

With reference now to FIG. 1B, a second exemplary configuration 101 of concave lens 110 in accordance with an embodiment is shown. Similar to first exemplary configuration 100, concave lens 110, as shown in FIG. 1B, includes concave surface 111 and another surface 112, wherein an amount of light is able to pass through concave surface 111 and another surface 112. However, in contrast to first exemplary configuration 100, concave lens 110 of second exemplary configuration 101 is configured so as to have more than one concave surface. In particular, another surface 112, in addition to concave surface 111, is substantially concave in shape. Indeed, it is noted that these surfaces are substantially concave, rather than convex, in that central or inner portions of the surfaces protrude inward toward concave lens 110. These concave surfaces are therefore in contrast to convex lens surfaces, wherein central or inner portions of such lens surfaces protrude outwardly while outer portions of the surfaces protrude inwardly.

In an embodiment, such as in the embodiment shown in FIG. 1B, concave surface 111 and another surface 112 are located at generally opposite sides of concave lens 110. As shown by arrows 113, an uneven lens thickness distribution is associated with concave lens 110, such as described above. However, in so much as both concave surface 111 and another surface 112 are substantially non-linear, the differences between the magnitudes of the widths (represented by arrows 113) of concave lens 110 are more significant in second exemplary configuration 101 than in first exemplary configuration 100. Therefore, it is noted that the unevenness of the lens thickness distribution associated with concave lens 110 is increased in response to a degree of concavity of concave surface 111 and/or another surface 112 being increased. Moreover, an exemplary implementation provides that this increased degree of unevenness enables concave lens 110 to refract light at a greater angle (in comparison to concave lens 110 of first exemplary configuration 100) such that a wider beam pattern is achieved.

The foregoing notwithstanding, in an embodiment, although concave surface 111 and another surface 112 are both substantially concave, such as shown in second exemplary configuration 101, one of such surfaces is more concave than the other such that different degrees of concavity are associated with the different lens surfaces of concave lens 110. Furthermore, one embodiment provides that the lens thickness distribution associated with a lens is controllable by tailoring or controlling one or more degrees of concavity associated with the lens surfaces of concave lens 110. In this manner, an exemplary implementation provides that the ability of a lens to refract light, and the magnitudes of the angles associated with such light refraction, is controlled by selecting a suitable lens thickness distribution.

Moreover, it is noted that various lenses discussed herein, such as concave lens 110, may include, or be constructed of, different materials, and that the present technology is not limited to any particular lens material. For example, in an embodiment, one or more lenses discussed herein, such as concave lens 110, includes a material selected from among a group of materials consisting essentially of plastic, glass, quartz and silicon. Indeed, in accordance with one exemplary implementation, concave lens 110 is constructed of a material, such as a polycarbonate or polyurethane plastic, which is sufficiently transparent so as to allow an amount of light to penetrate through such material. Moreover, an embodiment provides that a density distribution associated with the implemented material may be changed with respect to a focal point position of the lens such that the lens is configured to refract an amount of light based on a refractive index associated with the change in density distribution.

Figure 2A:
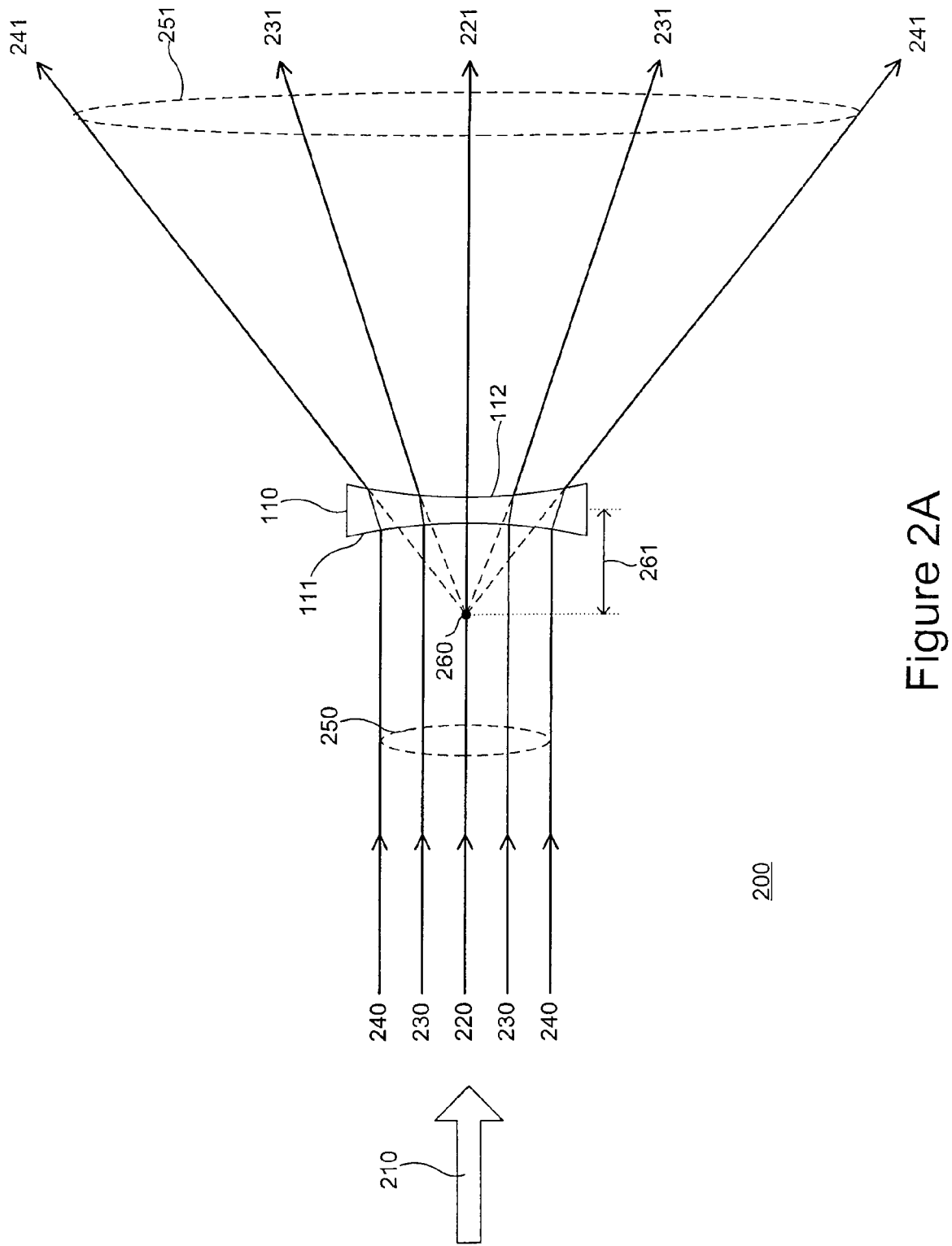
FIG. 2A is a cross-sectional diagram of a first exemplary implementation of a concave lens in accordance with an embodiment.

With reference now to FIG. 2A, a first exemplary implementation 200 of concave lens 110 in accordance with an embodiment is shown. As explained above, concave lens 110 includes a plurality of lens surfaces, wherein one or more of such surfaces are substantially concave, and wherein light beams are able to pass through the lens surfaces such that a number of these beams are refracted such that the respective directions of propagation of the refracted beams are altered. Accordingly, for purposes of illustration, first exemplary implementation 200 involves multiple beams of light traveling through concave lens 110. In particular, a narrow beam of light is emitted from a light source, wherein this narrow beam of light includes multiple individual light beams traveling in an initial direction of propagation 210. These individual light beams then travel through concave lens 110 such that concave lens 110 refracts a number of these light beams in a different direction, such as in an outward direction away from initial direction of propagation 210, and such that the direction of propagation of the refracted beams is changed.

To further illustrate, an embodiment provides that a plurality of light beams pass through concave lens 110. For purposes of illustration, these beams include a central beam 220, inner beams 230 and outer beams 240, and are collectively associated with a preliminary beam pattern 250. Central beam 220 passes through a central portion of concave lens 110 such that central beam 220 travels in a substantially same or similar direction 221 upon exiting concave lens 110 as central beam 220 was traveling before entering concave lens 110. In this manner, central beam 220 is characterized as having a substantially linear overall travel pattern.

However, due to a geometrical factor associated with concave lens 110, which may include an uneven thickness distribution such as described above, the vector directions of inner beams 230 and outer beams 240 are changed in response to inner beams 230 and outer beams 240 traveling through concave lens 110. Indeed, in the illustrated embodiment, the respective vector directions of inner beams 230 are changed upon traveling through concave lens 110 such that inner beams 230 travel in skewed directions 231 after traveling through concave lens 110. Similarly, the respective vector directions of outer beams 240 are changed upon traveling through concave lens 110 such that outer beams 240 travel in further skewed directions 241 after traveling through concave lens 110.

In this manner, an embodiment provides that a beam pattern associated with the light beams passing through concave lens 110, such as preliminary beam pattern 250, is widened after such beams pass through the lens surfaces of concave lens 110. For example, in so much as inner beams 230 and outer beams 240 are skewed upon passing through concave lens 110, inner beams 230 and outer beams 240, as well as central beam 220, are associated with a widened beam pattern 251. Furthermore, for purposes of illustration, an example provides that the vector directions of central beam 220, inner beams 230 and outer beams 240 upon exiting concave lens 110 are associated with a focal point 260 which is located an illustrative distance 261 from a central axis of concave lens.

Thus, in accordance with an embodiment, although one or more light beams enter concave lens 110 in a first direction, such beams will exit concave lens 110 in a different direction based on a geometric factor associated with concave lens 110. In an exemplary implementation, this geometric factor is a lens thickness distribution associated with concave lens 110, wherein such lens thickness distribution is measurably uneven. However, pursuant to one embodiment, and with reference again to FIGS. 1A and 1B, this geometric factor is a lens density distribution associated with concave lens 110, wherein a material density of concave lens 110 changes along the overall length (represented by arrow 114) of concave lens 110.

Consider the example where a lens is implemented such that a density distribution of material within the lens changes with respect to a focal point position of the lens. This change in the lens material density causes a refractive index associated with such lens to also be changed with respect to the focal point position of the lens. In this manner, an embodiment provides that a lens may be configured to have an uneven density distribution such that the lens is capable of refracting an amount of light, such as discussed herein.

Figure 2B:
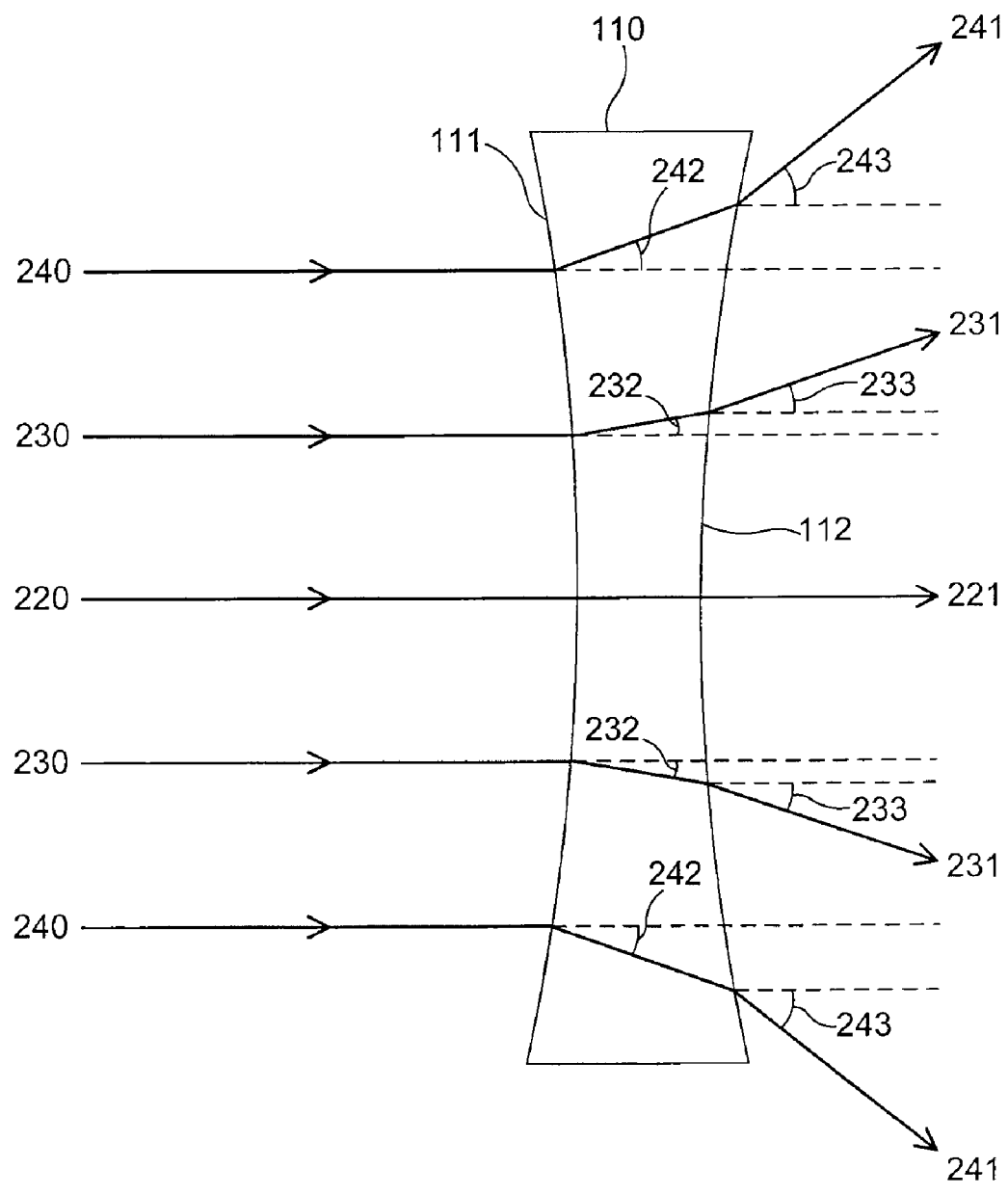
FIG. 2B is a cross-sectional diagram of a second exemplary implementation of a concave lens in accordance with an embodiment.

With reference now to FIG. 2B, a second exemplary implementation 201 of concave lens 110 in accordance with an embodiment is shown. Central beam 220, inner beams 230 and outer beams 240 enter concave lens 110 by passing through concave surface 111. In so much as concave surface 111 is substantially concave, inner beams 230 are refracted by primary inner refraction angles 232, while outer beams 240 are refracted by primary outer refraction angles 242. However, in so much as the vector direction of central beam 220 is substantially normal or perpendicular to a cross section of concave surface 111 through which central beam 220 penetrates, central beam 220 is not refracted upon entering concave lens 110.

Furthermore, central beam 220, inner beams 230 and outer beams 240 exit concave lens 110 by passing through another surface 112. In so much as another surface 112 is also substantially concave, inner beams 230 are refracted by secondary inner refraction angles 233, while outer beams 240 are refracted by secondary outer refraction angles 243. Additionally, in so much as the vector direction of central beam 220 is substantially normal or perpendicular to a cross section of another surface 112 through which central beam 220 penetrates, central beam 220 is not refracted upon exiting concave lens 110.

Thus, an embodiment provides that a lens is configured to refract a number of light beams that travel through the lens. However, although various exemplary implementations discussed herein utilize a lens that is substantially concave, the spirit and scope of the present technology is not limited to the use of a concave lens. Indeed, in accordance with one embodiment, one or more diverging lenses are utilized, wherein such lenses are configured to refract an amount of light, such as in a manner described herein, but which do not necessarily have a concave lens surface.

Figure 3:
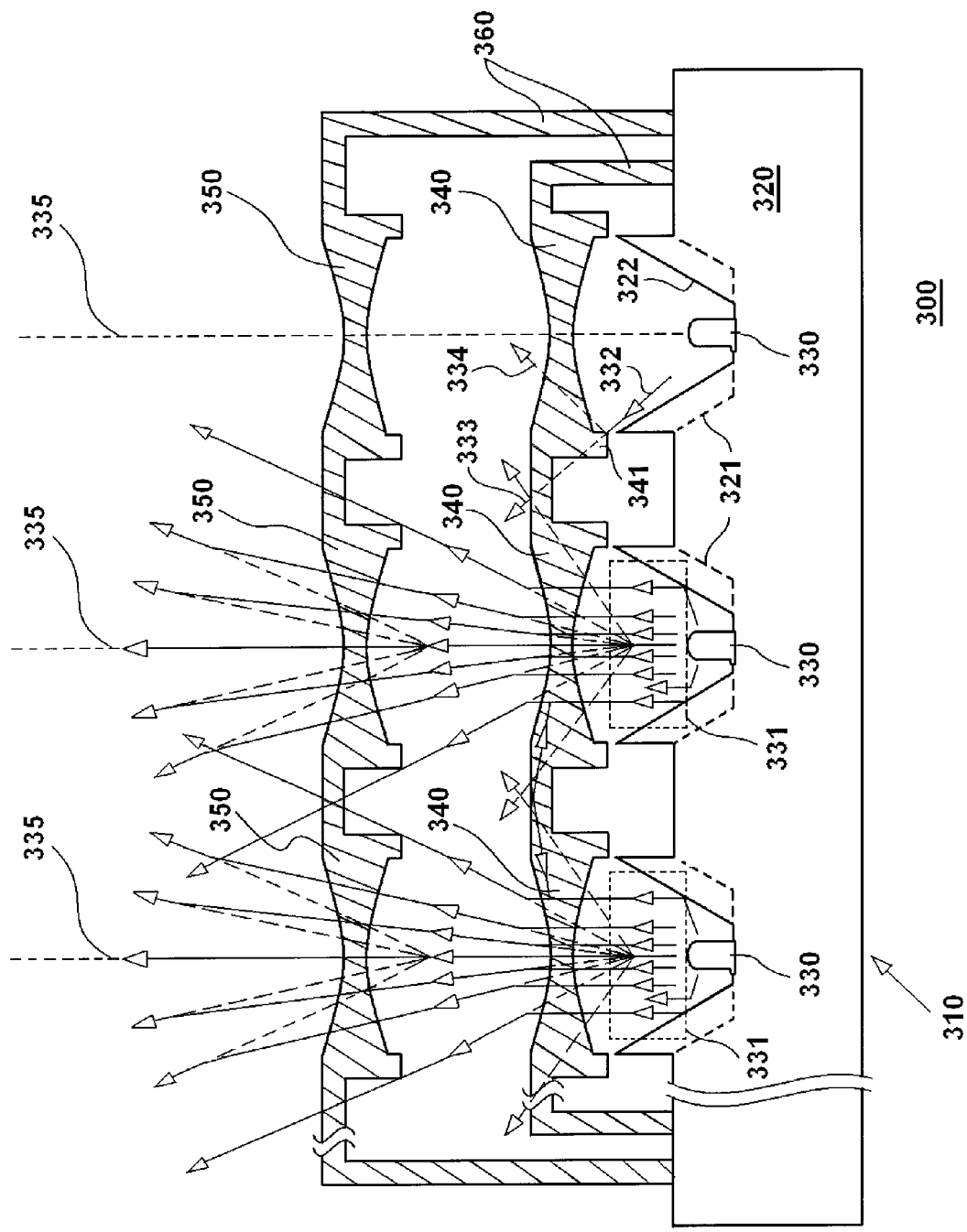
FIG. 3 is a cross-sectional diagram of an exemplary configuration of an illumination device in accordance with an embodiment.

With reference now to FIG. 3, an exemplary configuration 300 of an illumination device 310 in accordance with an embodiment is shown. Illumination device 310 includes a support member 320 and at least one light source, such as light sources 330, coupled or associated with support member 320. Illumination device 310 further includes a plurality of lenses, such as one or more of inner lenses 340 and/or one or more of outer lenses 350 as shown in the illustrated embodiment. The implemented lenses are positioned relative to the at least one light source such that light emitted by the at least one light source penetrates the lens surfaces of the lenses, and such that an amount of such light is refracted by the lens surfaces, such as in a manner described above.

In an embodiment, a power source (not shown) is coupled or associated with the at least one light source, wherein the power source is configured to provide the at least one light source with an amount of energy so as to enable the at least one light source to produce light. Consider the example where power source is an electric battery displaced within or adjacent to support member 320. The electrochemical composition of the battery enables the battery to store an electric charge and to provide the at least one light source with an amount of electric power, which the at least one light source converts into light.

Pursuant to one embodiment, the power source includes a photovoltaic cell. To illustrate, an example provides that a photovoltaic cell is utilized to convert an amount of ambient light into electric energy. This energy is then delivered or provided to the at least one light source of illumination device 310, which concerts the electric energy back into light. However, the newly generated light is emitted in a manner that enables an application of illumination device 310.

The foregoing notwithstanding, it is noted that the present technology is not limited to the aforementioned exemplary power sources. Indeed, other types of power sources may be implemented within the spirit and scope of the present technology.

It is further noted that various types of lens configurations may be implemented within the spirit and scope of the present technology. In one embodiment, each lens from among the plurality of lenses includes a plurality of optic surfaces separated in accordance with an uneven lens thickness distribution, such as described above. Additionally, at least one optic surface from among the plurality of optic surfaces is concave such that a plurality of concave surfaces are associated with the plurality of lenses. Moreover, the at least one light source, such as light sources 330, of illumination device 310 is configured to emit a light and is positioned relative to the plurality of lenses such that the light is configured to travel through the plurality of concave surfaces.

In this manner, a plurality of concave surfaces associated with different lenses are utilized to refract an amount of emitted light. By utilizing multiple lenses, an example provides that a greater degree of light refraction is achievable such that wider beam patterns are realized, and such that light distributions within the beam patterns become increasingly even, as is further discussed herein.

In one embodiment, illumination device 310 includes an array of lenses coupled or associated with support member 320. For example, the arrangement of inner lenses 340 in FIG. 3 constitutes an exemplary lens array, or lens layer. Additionally, each lens from among the array of lenses includes one or more concave or light refracting surfaces. Light emitted by each light source from among light sources 330 passes through one or more lenses within the array of lenses such that the refracted light patterns created by each lens contributes to the overall beam pattern created by illumination device 310. In this manner, an exemplary implementation provides that an array of lenses is implemented so as to generate a wider beam pattern than would be achievable with a single light refracting lens.

The foregoing notwithstanding, in an embodiment, a lens array, or lens layer, as described herein, refers to a lens layer that includes one or more concave surfaces on the same side of the lens layer, wherein the concave surfaces have the same or different surface geometry, or the same or different degree of concavity. However, in accordance with one example, a lens layer is implemented, wherein the implemented layer includes one or more concave surfaces on multiple sides of the lens layer, such as sides of the lens layer that are generally opposed in orientation (e.g., opposite sides of the lens layer). Moreover, these surfaces may have the same or different surface geometry, or the same or different degree of concavity.

Furthermore, in accordance with an embodiment, a plurality of lens arrays (or lens layers) are implemented, such as to further increase the width of a generated beam pattern and/or to increase an even distribution of light within the generated pattern. The lenses of the lens arrays each include at least one concave or light refracting surface. In particular, an example provides that the various lenses include a plurality of optic surfaces separated in accordance with an uneven lens thickness distribution, wherein at least one optic surface from among the plurality of optic surfaces is concave, such as shown in FIGS. 1A and 1B.

For purposes of illustration, an exemplary implementation of a plurality of lens arrays will now be explored. Consider the example where illumination device 310 includes a first lens array, such as described above, as well as a second array of lenses, such as an array that includes outer lenses 350, wherein the second lens array is coupled or associated with support member 320. An amount of light emitted by each light source from among light sources 330 is initially refracted by lenses from the first lens array such that the light beams emitted by each of light sources 330 are joined or summed into a collective beam pattern. However, in so much as a significant portion of the light emitted from light sources 330 continues to travel along or adjacent to axial directions of illumination associated with light sources 330, such as along axes of illumination 335, the light emitted by light sources 330 remains brightest along or adjacent to axes of illumination 335, which causes a light distribution within the collective beam pattern to be noticeably uneven.

The foregoing notwithstanding, when the light beams travel through the second lens array, a further beam refraction occurs such that an additional number of light beams are refracted away from axes of illumination 335, thus increasing an even distribution of the light within the generated pattern. Moreover, in so much as a greater number of beams are reflected toward an outside boundary of the generated beam pattern, the visibility of such boundary is increased. In this manner, a noticeable width of the generated pattern is further increased.

Thus, an embodiment provides that multiple lens arrays, or lens layers, are implemented. Pursuant to one embodiment, the implementation of multiple lens arrays serves to widen a beam pattern associated with light emitted by one or more light sources of illumination device 310. Moreover, in accordance with one example, these lens arrays are positioned relative to the one or more light sources of illumination device 310, as well as relative to one another, such that an even distribution of light within the aforementioned beam pattern is increased or maximized, such as further discussed herein.

It is noted that the spirit and scope of the present technology is not limited to the use of a single light source. Indeed, in an embodiment, illumination device 310 includes an array of light sources coupled or associated with support member 320. For example, the arrangement of light sources 330 in FIG. 3 constitutes an exemplary light source array. The array of light sources is configured to emit light, and is positioned relative to the aforementioned array of lenses such that the light emitted by the array of light sources travels through the one or more concave surfaces of the lenses of the lens array. Furthermore, a width of a beam pattern, such as preliminary beam pattern 250 shown in FIG. 2A, associated with the light is configured to be widened in response to the light traveling through the plurality of concave surfaces, such as described above.

To further illustrate, and with reference still to FIG. 3, light beams, such as light beams 331, are emitted by one or more of light sources 330. Light beams 331 then travel toward one or more of inner lenses 340. Moreover, in so much as each of inner lenses 340 has at least one concave or light refracting surface, various beams from among light beams 331 are skewed upon passing through one or more of inner lenses 340, such as described above with regard to FIGS. 2A and 2B. Accordingly, the skewing of such light beams causes a beam pattern associated with light beams 331 to be widened after light beams 331 have passed through one or more of inner lenses 340.

Moreover, pursuant to one embodiment in which a plurality of light sources are implemented, it is noted that an array of light sources is positioned relative to an array of lenses such that a beam pattern associated with the light emitted by the array of light sources is widened in response to the light traveling through a plurality of concave surfaces associated with the array of lenses. Additionally, one or more of outer lenses 350 are positioned such that these light beams travel through one or more of outer lenses 350, and such that the aforementioned beam pattern is further widened. Thus, an embodiment provides that multiple lens layers are implemented so as to further widen a beam pattern generated by multiple light sources, wherein each lens layer includes one or more concave or light refracting lenses, such as concave lens 110.

The foregoing notwithstanding, in one example, while light is primarily projected along the axial direction of a light source, a significant amount of light is also emitted from the sides of the light source. Consider the example where each light source from among light sources 330 emits an amount of light along an axial direction of illumination associated with the light source, such as along axes of illumination 335. Additionally, light sources 330 emit an amount of light in a direction other than along an axial direction of illumination. For example, an amount of light may be emitted from the sides of light sources 330.

Accordingly, in an embodiment, the strength or magnitude of illumination associated with a beam pattern is increased by directing a significant portion of light emitted by a light source, such as light that is not initially traveling along an axial direction of illumination associated with the light source, toward one or more of inner lenses 340 and/or one or more of outer lenses 350. In this manner, the light emitted by the light source is more efficiently utilized.

To illustrate, an embodiment provides that illumination device 310 includes at least one reflector, such as reflectors 321, coupled or associated with support member 320. The at least one reflector includes one or more reflective surfaces, such as reflective surface 322 shown in FIG. 3, which is configured to reflect light. The one or more reflective surfaces are angled relative to the plurality of lenses of illumination device 310 such that the at least one reflector is configured to reflect an amount of the light emitted by the at least one light source in a direction toward the plurality of lenses of illumination device 310, such as toward one or more of inner lenses 340 and/or one or more of outer lenses 350. In this manner, an example provides that a number of reflectors are disposed around, near or adjacent to light sources 330 so as to reflect or redirect an amount of light toward inner lenses 340. The redirected light then travels through inner lenses 340, and at least a portion of this redirected light is refracted away from axes of illumination 335 as such light leaves the refracting lenses.

The foregoing notwithstanding, in an embodiment, illumination device 310 includes a plurality of flange elements, such as flange element 341 shown in FIG. 3, coupled or associated with the plurality of lenses of illumination device 310. The plurality of flange elements are configured to allow portions of the light emitted by the at least one light source of illumination device 310 to travel through the plurality of flange elements. Additionally, each flange element from among the plurality of flange elements is further configured to direct other portions of the light toward a lens from among the plurality of lenses of illumination device 310.

For example, an exemplary light beam 332 is emitted from one of light sources 330. A portion 333 of exemplary light beam 332 travels through flange element 341. Additionally, flange element 341 reflects, refracts or redirects another portion 334 of exemplary light beam 332 toward an inner lens from among inner lenses 340 such that another portion 334 of exemplary light beam 332 travels through such lens.

Thus, an embodiment provides that the amount of light that travels through the plurality of lenses of illumination device 310 is increased by associating a number of flange elements with such lenses. In particular, these flange elements, which may be positioned around the edge of inner lenses 340 and/or outer lenses 350, are implemented so as to capture and direct an amount of light in a direction of optimal use. In effect, each flange element is configured to refract light that may be directed away from the interior portions of a refracting lens back through the effective refracting portions of the lens.

Moreover, in accordance with an exemplary implementation, the flange elements are configured to reflect a number of light beams while allowing a number of other light beams to penetrate and pass through the flange elements. Accordingly, it is noted that in so much as at least a portion of light is able to travel through the flange elements, the even distribution of light within the generated beam pattern may be further increased.

In addition to the foregoing, an embodiment provides that the flange elements aid in the fabrication of the lenses. Consider the example where a mold injection process is utilized to produce or fabricate a lens array, wherein a plurality of different lenses are molded into the array. It is noted that an amount of power is utilized to execute this mold injection process, and that the smoothness of the lenses of the array is dependent on the type of mold that is implemented, as well as the method of utilizing such mold. In an exemplary implementation, less power may be expended during the mold injection process when a plurality of flange elements, such as the exemplary flange elements described above, are created during the mold injection process such that the flange elements are coupled to the lens array. Moreover, in accordance with an embodiment, these flange elements act as mechanical buffers during the mold injection process such that a smoothness of the lenses may be increased.

The foregoing notwithstanding, various physical architectures may be implemented within the spirit and scope of the present technology. To illustrate, in an embodiment, the plurality of lenses of illumination device 310 are coupled or associated with support member 320. For example, inner lenses 340 and outer lenses 350 are coupled with support member by means of one or more coupling structures, such as coupling structures 360 as shown in FIG. 3. Moreover, one exemplary implementation provides that support member 320 is embodied within one or more of coupling structures 360 such that one or more of coupling structures are coupled to the at least one light source of illumination device 310.

It is further noted that, in accordance with an embodiment, reflectors 321 are mechanically coupled with support member 320. Pursuant to one embodiment, however, reflectors 321 constitute a portion of support member 320. To illustrate, an example provides that support member 320 is manufactured so as to include a number of skewed surfaces, such as reflective surface 322. Additionally, these skewed surfaces include or are covered with a reflective material such that the skewed surfaces are able to reflect an amount of light.

Thus, an embodiment provides that the components of illumination device 310 are physically integrated, or otherwise associated with one another. However, the spirit and scope of the present technology is not limited to the exemplary physical configurations disclosed herein. Indeed, various other configurations may be implemented within the spirit and scope of the present technology.

Additionally, it is noted that various types of light sources may be implemented within the spirit and scope of the present technology. To illustrate, in an embodiment, one or more light sources of illumination device 310 includes a LED configured to emit light. Pursuant to one exemplary implementation, however, one or more light sources of illumination device 310 includes or constitutes a light source other than a LED. Thus, it is noted that other types of light sources, such as electric lamps, incandescent bulbs and fluorescent tubes, may also be implemented within the spirit and scope of the present technology.

With reference now to the distribution of light within a generated beam pattern, it is noted that, pursuant to an exemplary scenario, a light beam pattern associated with light emitted by the at least one light source of illumination device 310 after such light has passed through one or more of inner lenses 340 is characterized by an uneven light distribution, such as described above. In particular, an uneven distribution of the light within the beam pattern causes one or more portions of the beam pattern to appear brighter, or more illuminated, than one or more other portions of the beam pattern. For purposes of illustration, this exemplary scenario will be further explored herein so as to illustrate certain exemplary benefits of illumination device 310 in accordance with an embodiment.

Figure 4B:
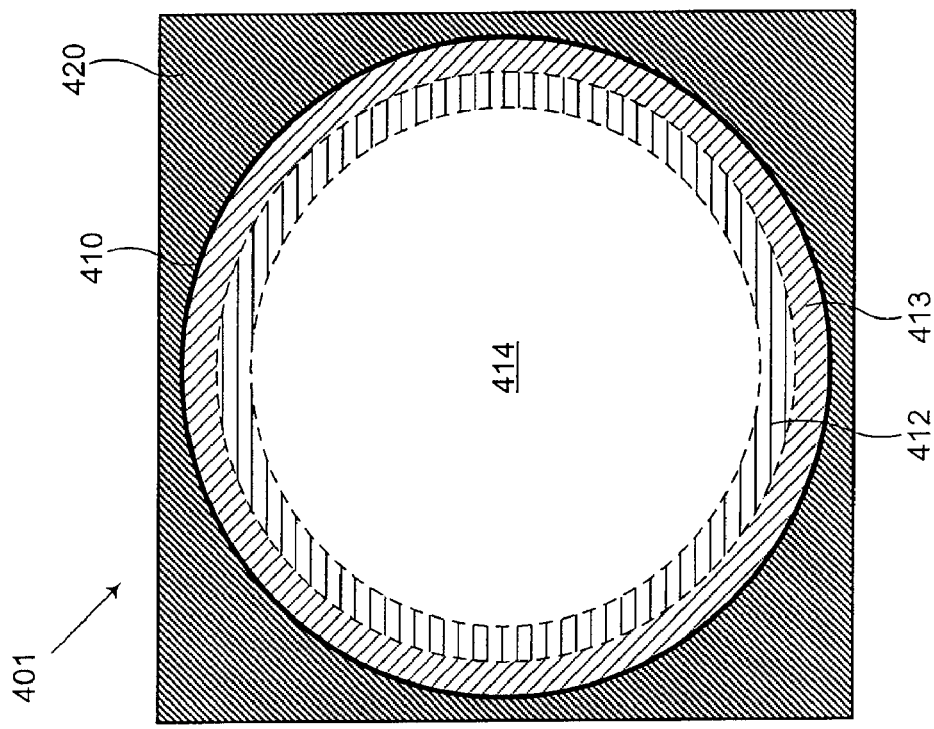
FIG. 4B is a diagram of a second exemplary beam distribution in accordance with an embodiment.
Figure 4A:
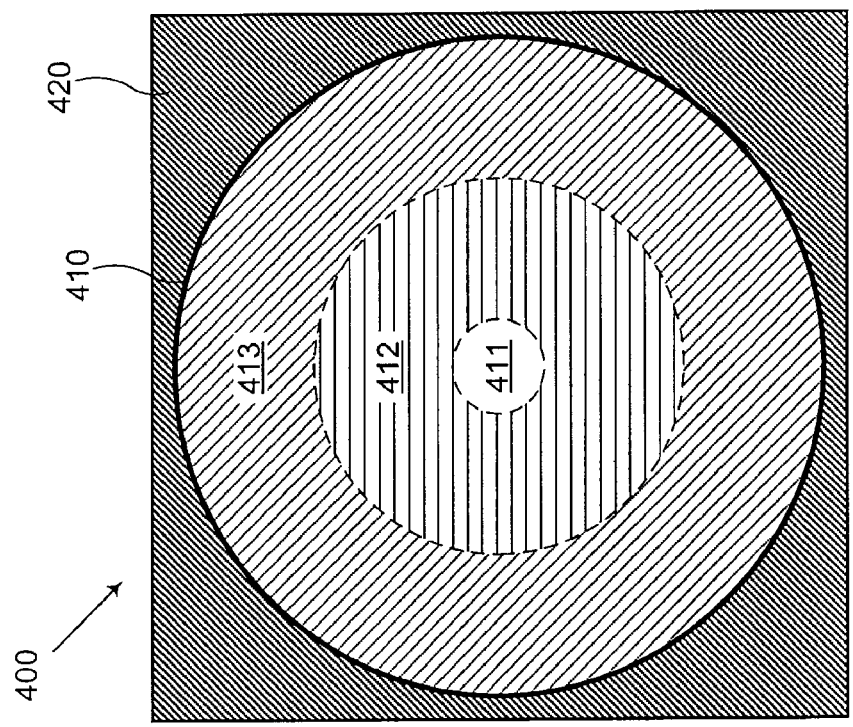
FIG. 4A is a diagram of a first exemplary beam distribution in accordance with an embodiment.

With reference now to FIG. 4A, a first exemplary beam distribution 400 in accordance with an embodiment is shown. In particular, an exemplary beam pattern 410 is positioned within an ambient environment 420. Additionally, exemplary beam pattern 410 is characterized as having an uneven light distribution. In particular, different amounts of light are concentrated at different portions of exemplary beam pattern 410 such that one or more portions of exemplary beam pattern 410 appear brighter, or more illuminated, than one or more other portions of exemplary beam pattern 410.

To further illustrate, and with reference still to FIG. 4A, exemplary beam pattern 410 includes a number of different regions, such as a central region 411, an inner region 412 and an outer region 413. A significant amount of the light that generates exemplary beam pattern 410 is concentrated within central region 411, such that central region 411 is brighter, or more illuminated, than inner region 412 and outer region 413. An additional amount of light is concentrated within inner region 412. However, inner region 412 is darker, or less illuminated, than central region 411. Moreover, an amount of light is also concentrated within outer region 413. However, outer region 413 is darker or less illuminated than both central region 411 and inner region 412. Thus, although the various regions of exemplary beam pattern are characterized as having a greater degree of illumination than ambient environment 420, these regions have varying degrees of illumination.

In an embodiment, however, a configuration of one or more lenses of illumination device 310 is configured to increase or maximize an even light distribution associated with exemplary beam pattern 410. To illustrate, and with reference now to FIG. 4B, a second exemplary beam distribution 401 in accordance with an embodiment is shown. A configuration of one or more lenses of illumination device 310 is configured such that a greater amount of the light that travels through these one or more lenses is dispersed or refracted away from an axial direction of illumination associated with a light source of illumination device 310 such that a significant portion of such light is evenly dispersed within an even distribution region 414, which encompasses a significant portion of exemplary beam pattern 410. Therefore, in contrast to first exemplary beam distribution 400 shown in FIG. 4A, which is characterized by a significant disparity in beam distribution across a significant portion of exemplary beam pattern 410, an example provides that the amount of beam distribution associated with second exemplary beam distribution 401 is significantly increased.

Thus, in accordance with an embodiment, a configuration of one or more lenses of illumination device 310 is configured to increase or maximize an even light distribution associated with exemplary beam pattern 410. Pursuant to one example, lenses from among an array of lenses of illumination device 310 are configured in accordance with a geometric factor such that an even distribution of the light within a beam pattern is increased in response to the light traveling through the concave or light refracting surfaces of such lenses.

To illustrate, and with reference again to FIG. 2B, an example provides that a thickness distribution and/or a degree of concavity of one or more of the lenses of illumination device 310 is configured so as to cause a number of light beams that pass through the aforementioned one or more lenses to be deflected to a greater degree such that a number of refraction angles, such as secondary inner refraction angles 233 and secondary outer refraction angles 243, are increased. In this manner, and with reference again to FIG. 4B, a number of light beams are deflected a greater distance away from an axial direction of illumination of a light source such that an area associated with even distribution region 414 within exemplary beam pattern 410 is increased, and such that a light distribution within such region is increased or maximized.

In accordance with one embodiment, however, the aforementioned geometric factor is a surface geometry associated with one or more lenses of illumination device 310. Consider the example where the lens surfaces of multiple lenses in a lens array are substantially square or rectangular shaped, rather than circular, such that a distance between such lenses may be minimized. With reference again to FIG. 4B, in so much as light shines through each of these lens surfaces such that a width of a beam pattern associated with such light is increased, and in so much as the distance between the lenses is minimized due to the square or rectangular geometries of these lenses, a number of light beams are deflected a greater distance away from an axial direction of illumination such that an area associated with even distribution region 414 within exemplary beam pattern 410 is increased, and such that a light distribution within such region is increased or maximized.

Thus, an embodiment provides that lenses from among an array of lenses of illumination device 310 are configured in accordance with a geometric factor such that an even distribution of the light within a beam pattern is increased in response to the light traveling through the concave surfaces of such lenses. Indeed, in accordance with one embodiment, this geometric factor is selected from among a group of geometric factors consisting essentially of a surface geometry, a thickness distribution, a material density, and a degree of concavity.

In one embodiment, a distance between a light source of illumination device 310 and one or more lens arrays is selected so as to increase, optimize or maximize an even distribution of light within a generated beam pattern. Consider the example where illumination device 310 is configured such that inner lenses 340 are displaced a specific distance from light sources 330 such that an even light distribution within a beam pattern is increased.

Moreover, in an embodiment, a plurality of lens arrays are utilized so as to further increase the even light distribution within a beam pattern. To illustrate, and with reference again to FIG. 3, an exemplary implementation involves an array of light sources, such as light sources 330, which are configured to emit light, such as described above. Additionally, a plurality of lens arrays are positioned different distances from the array of light sources along an axial direction of illumination associated with the array of light sources. The light emitted by the various light sources travels through each of the lens arrays such that an even distribution of the light within a beam pattern associated with the emitted light is increased in response to the light traveling through the concave or light refracting surfaces associated with the lenses of the lens arrays.

Moreover, in an embodiment, the degree of light distribution within a generated beam pattern is a function of the distance between the various lens arrays. Accordingly, in one exemplary implementation, a distance between two or more lens arrays is selected based on a target light distribution. Indeed, in one example, a distance between two or more lens arrays is selected so as to increase, optimize or maximize an even distribution of light with a beam pattern.

To further illustrate, in an embodiment, various lenses from among the plurality of lenses of illumination device 310 are displaced different distances from at least one light source of illumination device 310 along an axis of illumination associated with the at least one light source, such as axes of illumination 335 associated with light sources 330. As a result of this displacement of the aforementioned lenses, an even distribution of the light within a beam pattern associated with such light is increased in response to the light traveling through the concave or light refracting surfaces associated with such lenses.

Moreover, in an embodiment, illumination device 310 includes an array of light sources as well as multiple lens arrays. A first lens array is positioned relative to the array of light sources such that light emitted by such light sources travels through the lenses of such array, and such that a beam pattern associated with such light is widened. Additionally, a second lens array is positioned relative to the array of light sources and the first lens array such that the light travels through the lenses of the second array after traveling through the lenses of the first array. Moreover, the second array is positioned relative to the first lens array such that an even distribution of light within the beam pattern associated with such light is further increased in response to the light traveling through the optic surfaces of the lenses within the second lens array.

Thus, an embodiment provides that lenses from among the plurality of lenses of illumination device 310 are displaced within different lens arrays, wherein the different lens arrays are displaced different distances from a light source of illumination device 310 along an axis of illumination associated with the light source such that the width of a beam pattern associated with light emitted by the light source is widened in response to the light traveling through a first lens array, and is further widened in response to traveling through a second lens array.

The foregoing notwithstanding, the present technology is not limited to the use of two lens arrays, or lens layers. Indeed, additional lens arrays, or lens layers, may be implemented within the spirit and scope of the present technology, such as to further widen a beam pattern and/or increase an even distribution of light within such beam pattern.

Figure 5:
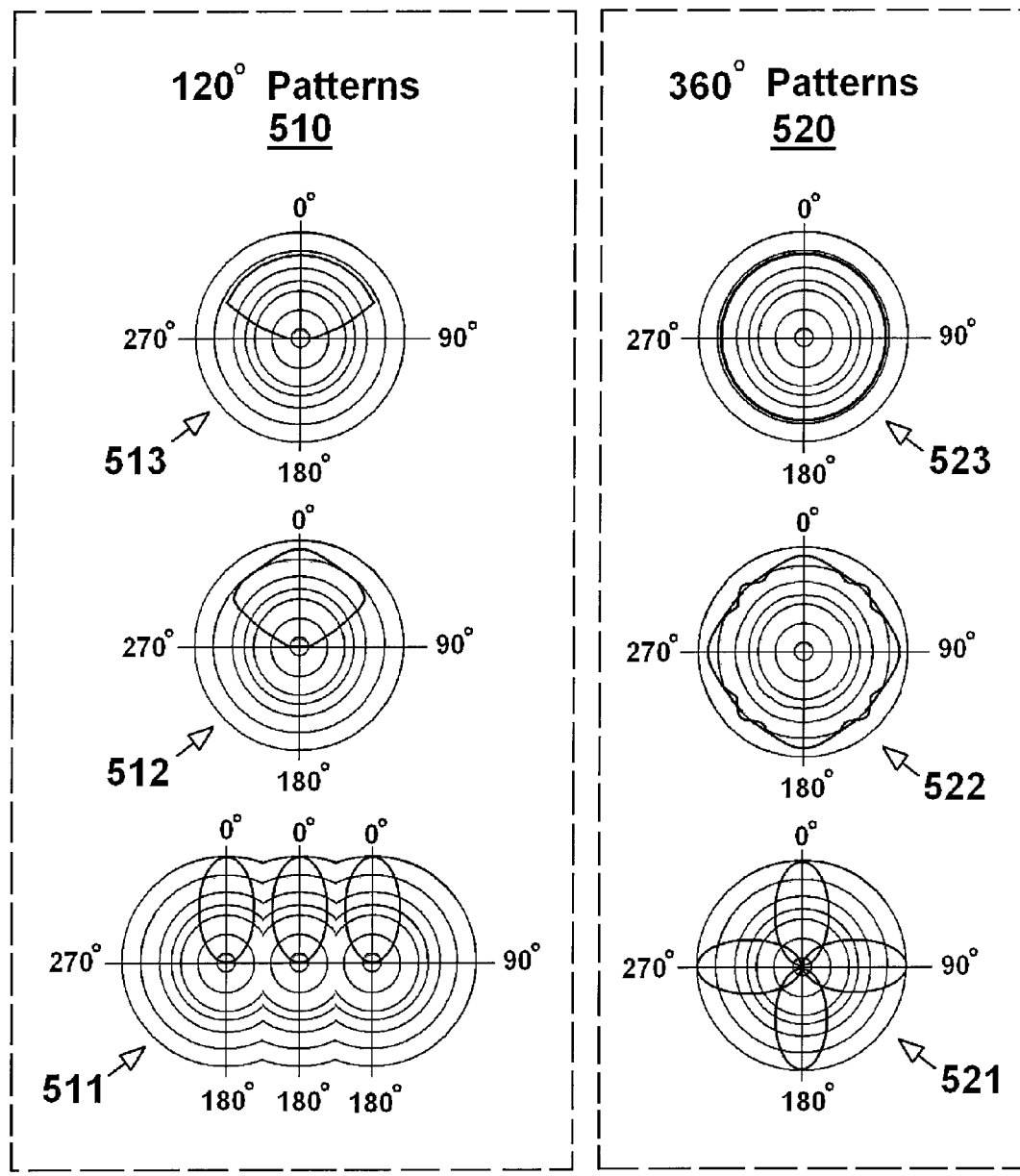
FIG. 5 illustrates a plurality of exemplary radiation patterns in accordance with an embodiment.

With reference now to FIG. 5, a plurality of exemplary radiation patterns 500 in accordance with an embodiment are shown. Exemplary radiation patterns 500 include, for purposes of illustration, a number of "120° models" 510 as well as a number of "360° models" 520. With reference to "120° models" 510, initial radiation patterns 511 associated with a number of different light sources in a light source array are shown. It is noted that initial radiation patterns 511 represent an amount of light that is initially emitted by the different light sources. It is further noted that the directivity of the lobes of initial radiation patterns 511 is substantially aligned at 0°, which, for purposes of illustration, corresponds to the axial directions of illumination associated with the light sources.

Thus, in an embodiment, a significant amount of the light emitted by the aforementioned light sources is directed toward 0°, such as by reflectors 321 shown in FIG. 3, or such as by a characteristic geometry or light emission propensity of the light sources. Indeed, pursuant to one implementation, an amount of light emitted in a direction other than toward 0° is blocked while another portion of the light is permitted to travel toward 0°.

With reference still to FIG. 5, upon passing through a single lens array, the lobes of initial radiation patterns 511 are joined into a single lobe as shown in conjoined pattern 512. The magnitude of the directivity of this lobe is smaller than that associated with the initial radiation lobes of the individual light sources, as shown in initial radiation patterns 511. In particular, the combined radiation of conjoined pattern 512 is more evenly dispersed in directions other than toward 0°, which serves to create a wider beam pattern, as well as a more even light distribution within such beam pattern.

With reference still to FIG. 5, upon passing through a second lens array, a refined radiation lobe is formed in refined pattern 513, wherein the magnitude of the directivity of the refined lobe is even less than that of the lobe shown in conjoined pattern 512. In particular, the radiation pattern associated with refined pattern 513 is more evenly dispersed across a width of the refined lobe when compared to the radiation distribution achieved in conjoined pattern 512. The significantly even light distribution associated with the radiation pattern of refined pattern 513 serves to create an even wider beam pattern than that associated with conjoined pattern 512, as well as a more even light distribution within such beam pattern.

With reference now to "360° models" 520, it is noted that a number of 360° representations of an exemplary radiation distribution paradigm in accordance with an embodiment are shown. In particular, multiple radiation patterns associated with various light sources are represented in an initial model 521 of such radiation patterns such that the directivities associated with such patterns are centered at 0°, 90°, 180°, and 360°, respectively. Upon passing through a first lens array, the directivities associated with these radiation patterns become smaller such that a more even light distribution is achieved, as shown in secondary model 522.

Moreover, upon passing through a second lens array, the directivities associated with such radiation patterns become even smaller. In particular, a radiation pattern is achieved, as shown in refined model 523, wherein the emitted radiation is substantially uniform or omnidirectional. In this manner, multiple lens arrays are utilized so as to cause a light distribution associated with a plurality of light sources to become substantially even over a radiation pattern associated with such light distribution.

Exemplary Implementations

As mentioned above, the present technology may be implemented in a wide range of applications. Pursuant to one embodiment, an illumination device is utilized to provide an amount of ambient lighting, and an even distribution of light within a beam pattern generated by the illumination device is increased or maximized so as to optimize the efficacy or utility of the ambient lighting. For example, in so much as an uneven light distribution within a generated beam pattern may be strenuous on a viewers eyes, such as when the viewer is utilizing the beam pattern to illuminate symbols or text that the viewer is attempting to interpret (e.g., during reading applications), it is noted that various embodiments of the present technology may be implemented so as to increase an even distribution of light within a beam pattern so as to alleviate or minimize the stress on a viewers eyes.

It is further noted that, in accordance with an embodiment, the present technology may be utilized to increase the viewability of an illumination device. Consider the example where an illumination device is a safety or traffic light. In so much as various legal requirements may stipulate that a safety/traffic light is to be viewable from a specific angle away from an axial direction of illumination associated with the illumination device, various embodiments of the present technology may be implemented so as to increase a viewable angle associated with the safety/traffic light. Furthermore, in so much as various legal requirements may stipulate that a safety/traffic light is to illuminate light pursuant to a specific light intensity at different angles, various embodiments of the present technology may be implemented so as to increase the light intensity emitted from an illumination device at various angles away from an axial direction of illumination.

Moreover, in one example, the present technology may be utilized to provide an efficient means of ambient lighting, such as by utilizing high intensity light sources that utilize relatively low amounts of power. As discussed above, various types of light sources may be implemented within the spirit and scope of the present technology. In one exemplary implementation, one or more LED lamps are utilized in conjunction with an illumination device, such as illumination device 310 shown in FIG. 3. Indeed, in so much as an exemplary scenario provides that LED lamps are characterized as being more efficient than incandescent and/or fluorescent lamps, the one or more LED lamps may be implemented due to the electrical power efficiency associated with such LED power sources.

To illustrate, consider the exemplary implementation of LED lamps utilized in conjunction with a safety or hazard light, wherein the safety or hazard light is powered by a power source, such as a battery. In so much as LED lamps utilize less power than incandescent or fluorescent lamps, the use of LED lamps would increase the electrical power efficiency of the safety/hazard light, thus enabling the power source to continue to power the safety/hazard light for a longer period of time.

The foregoing notwithstanding, an embodiment provides that LED lamps tend to cast light in a particular direction at a relatively narrow angle in comparison to incandescent or fluorescent lamps. In particular, light from an LED lamp is emitted primarily in the axial direction of the LED lamp, which results in a relatively narrow viewing angle such that as one moves angularly away from the axial direction of the lamp, relatively little light will be visible. Indeed, pursuant to one example, the fact that an LED lamp emits much of its light along its axial direction may be disadvantageous.

To illustrate, consider the exemplary implementation of LED lamps utilized in conjunction with a safety or hazard light. Although the use of LED lamps with the safety/hazard light offers the advantage of increased electrical power efficiency, the unidirectional propensity of the LED light poses a drawback. For example, in so much as the purpose of the safety/hazard light is to communicate safety or hazard information to a viewer, it would not be beneficial to the viewer if the viewer were able to view the light emitted from the safety/hazard light when the viewer is displaced within a path of the narrow beam of light emitting from an LED lamp, but not when the viewer is displaced outside of such a narrow path. Indeed, it is further noted that light that is fairly diffuse and random may not travel well or be adequately viewable in certain environments, such as in foggy weather conditions.

Thus, pursuant to an exemplary scenario, it would be beneficial to a viewer for the light emitted from a light source, such as a safety/hazard light, to be emitted at a wider angle such that the light is viewable to the viewer when the viewer is located farther away from the axial direction of illumination associated with the emitted light.

In an embodiment, an illumination device is provided that is configured to remedy the aforementioned problem associated with a narrow light beam of an LED lamp, while simultaneously taking advantage of the energy efficiency associated with an LED light source. In particular, a plurality of concave lenses are positioned different distances from the LED lamp along an axial direction of illumination associated with the LED lamp. Light emitted from the LED lamp travels through these different lenses such that a portion of the axial light is refracted away from the aforementioned axial direction of illumination, such as in a manner described above. This enables a wider beam pattern to be achieved. Moreover, in so much as a plurality of refracting lenses are implemented along this axial direction, the width of the beam pattern will be wider than if a single lens were implemented, and the light distribution within such beam pattern will be more evenly dispersed.

Thus, an embodiment provides that two or more lenses are utilized in a series so as to cause a diffusion of light. For example, after LED emitted light is diffused through a first lens, the diffused light from this first lens is further acted on by one or more other lenses positioned so as to further affect or refract such light. Additionally, in accordance with an embodiment, one or more light reflectors and/or flange elements are implemented so as to direct a portion of light through the lenses of the illumination device. The result is a lighting arrangement that maximizes the power efficiency feature of LED lamps and optimizes the use of the emitted light, while overcoming limitations posed by a unidirectional nature of LED lighting.

Pursuant to one embodiment, a greater degree of light intensity is achieved by utilizing a greater number of light sources. For example, an array of a significant number of LEDs may be implemented such that the axial directions of illumination associated with such LEDs are aligned in the same, or a similar, direction, and such that the combination of the LED light sources emit a significant amount of light in a particular direction. However, in so much as this significant amount of light generates a relatively narrow, albeit intense, light beam in the aforementioned direction of propagation, a greater degree of beam refraction is implemented so as to adequately disperse the intense light over a wider area, and so as to achieve a more even distribution of light within the widened beam pattern. Thus, an embodiment provides that multiple lens arrays or layers are implemented to achieve the target lighting effect, wherein the number lens arrays to be implemented is dependent on the intensity of the light emitted by the light sources.

The foregoing notwithstanding, the spirit and scope of the present technology is not limited to the exemplary implementations disclosed herein. Indeed, the present technology may be implemented in various ways so as to achieve different objectives. To illustrate, an example provides that a plurality of LED lamps are positioned behind a single, larger lens, and the collective light emitted by the multiple LED lamps is diffused as effectively as if the light was emitted from a single LED source. Additionally, in accordance with one example, the number of lenses utilized, as well as the type and curvature of such lenses, is selected based on a target light effect. Indeed, pursuant to one exemplary implementation, the target degrees of diffusion and light intensity are controllable by adjusting or changing the curvature of the lenses based on a target curvature, or by selecting and implementing lenses based on the target curvature.

Furthermore, while an embodiment provides an illumination device that utilizes a round lens and a round flange element, one exemplary implementation provides that the lens has a substantially non-rounded shape. Moreover, an embodiment provides that the flange element associated with such lens has a non-annular shape.

Thus, an embodiment provides that a plurality of LED lamps are utilized. In one example, these LED lamps include semiconductor diodes configured to emit light in accordance with a narrow light spectrum. Moreover, the color of the light emitted by such LED lamps is based on the composition and condition of the semiconductor material contained within such LED lamps. Thus, pursuant to an exemplary implementation, the color of the emitted light is capable of being selected. In particular, LED lamps including a specific type of semiconductor material are selected based on a target color spectrum.

It is noted that various exemplary implementations are disclosed herein. However, although the use of one or more lighting arrangements as discussed herein may be used in accordance with numerous different applications and situations, such applications are not limited to that of safety and hazard lights. Rather, the use of such an arrangement in safety and hazard lights is presented herein as an exemplary implementation. Indeed, a lighting arrangement in accordance with the spirit and scope of the present technology may be implemented in various other applications, such as with household and desktop lamps.

In addition, light sources other than LED lamps may benefit from an arrangement discussed herein. For example, other types of lighting where light rays are emitted from a substantially flat emitting source and where the light is directed along a relatively narrow beam may also be utilized in a similar arrangement.

Although various mechanical, electromechanical, electromagnetic and optic configurations are discussed herein, these configurations are presented as exemplary implementations, and are not intended to suggest any limitation as to the scope of use or functionality of the present technology. Moreover, such systems are not to be interpreted as having any dependency or relation to any one or combination of components illustrated in the disclosed examples.

Summary Concepts

It is noted that the foregoing discussion has presented at least the following concepts:

Concept 0. A light refraction illumination device comprising or including:

at least one light emitting diode (LED) configured to emit light; and at least one concave lens located generally opposite the at least one LED and along an axis of illumination associated with the LED such that the at least one concave lens is configured to widen a beam pattern associated with the light.

Concept 1. A light refraction illumination device comprising or including:

a support member;

a plurality of lenses associated with the support member, each lens from among the plurality of lenses comprising or including a plurality of concave surfaces; and at least one light source associated with the support member, the at least one light source configured to emit light, and the at least one light source positioned relative to the plurality of lenses such that the light is configured to travel through the plurality of concave surfaces.

Concept 2. The light refraction illumination device of Concept 1, wherein the plurality of lenses are positioned along an axis of illumination associated with the at least one light source such that the plurality of lenses are configured to refract a portion of the light away from the axis of illumination in response to the light traveling through the plurality of concave surfaces.

Concept 3. The light refraction illumination device of Concept 1, wherein the plurality of lenses are configured in accordance with a geometric factor such that the plurality of lenses are configured to increase an even distribution of the light within a beam pattern associated with the light in response to the light traveling through the plurality of concave surfaces.

Concept 4. The light refraction illumination device of Concept 2, wherein the geometric factor is selected from among a group of geometric factors consisting essentially of a surface geometry, a thickness distribution, a material density, and a degree of concavity.

Concept 5. A light refraction illumination device comprising or including:
 a support member;
 an array of lenses associated with the support member, each lens from among the array of lenses comprising or including a plurality of concave surfaces; and
 an array of light sources associated with the support member, the array of light sources configured to emit light, and the array of light sources positioned relative to the array of lenses such that the light is configured to travel through the plurality of concave surfaces.

Concept 6. The light refraction illumination device of Concept 5, wherein the array of lenses is positioned relative to the array of light sources such that the array of lenses is configured to widen a beam pattern associated with the light in response to the light traveling through the plurality of concave surfaces.

Concept 7. The light refraction illumination device of Concept 6, wherein the array of lenses is positioned relative to the array of light sources such that the array of lenses is configured to increase an even distribution of the light within the beam pattern in response to the light traveling through the plurality of concave surfaces.

Concept 8. The light refraction illumination device of Concept 7, further comprising or including:
 another array of lenses associated with the support member, each lens from among the another array of lenses comprising or including at least one light refracting surface such that a plurality of light refracting surfaces are associated with the another array of lenses.

Concept 9. The light refraction illumination device of Concept 8, wherein the another array of lenses is positioned relative to the array of light sources such that the light is configured to travel through the plurality of light refracting surfaces after traveling through the plurality of concave surfaces, and such that the another array of lenses is configured to further increase the even distribution in response to the light traveling through the plurality of light refracting surfaces.

Concept 10. The light refraction illumination device of Concept 5, further comprising or including:
 a plurality of reflectors associated with the support member, the plurality of reflectors configured to reflect an amount of the light in a direction toward the array of lenses.

Concept 11. The light refraction illumination device of Concept 5, further comprising or including:
 a plurality of flange elements associated with the array of lenses, the plurality of flange elements configured to allow portions of the light to travel through the plurality of flange elements, and each flange element from among the plurality of flange elements being further configured to direct other portions of the light toward a lens from among the array of lenses.

Concept 12. The light refraction illumination device of Concept 5, wherein the array of light sources comprises or includes a plurality of light emitting diodes (LEDs) configured to emit the light.

Concept 13. A light refraction illumination device comprising or including:
 a support member;
 a light source associated with the support member, the light source configured to emit light along an axis of illumination; and
 a plurality of lenses associated with the support member, each lens from among the plurality of lenses comprising or including at least one light refracting surface such that a plurality of light refracting surfaces are associated with the plurality of lenses, and the plurality of lenses positioned along the axis of illumination such that the plurality of lenses are configured to refract a portion of the light away from the axis of illumination in response to the light traveling through the plurality of light refracting surfaces.

Concept 14. The light refraction illumination device of Concept 13, wherein each lens from among the plurality of lenses comprises or includes a plurality of optic surfaces separated in accordance with an uneven lens thickness distribution, and wherein at least one optic surface from among the plurality of optic surfaces is a concave surface.

Concept 15. The light refraction illumination device of Concept 13, wherein lenses from among the plurality of lenses are positioned relative to the light source such that the lenses are configured to widen a width of a beam pattern associated with the light in response to the light traveling through the plurality of light refracting surfaces.

Concept 16. The light refraction illumination device of Concept 15, wherein the lenses are displaced different distances from the light source along the axis of illumination such that the lenses are configured to increase an even distribution of the light within the beam pattern in response to the light traveling through the plurality of light refracting surfaces.

Concept 17. The light refraction illumination device of Concept 13, further comprising or including:
 a reflector associated with the support member, the reflector configured to reflect an amount of the light in a direction toward the plurality of lenses.

Concept 18. The light refraction illumination device of Concept 13, further comprising or including:
 a plurality of flange elements associated with the plurality of lenses, the plurality of flange elements configured to allow portions of the light to travel through the plurality of flange elements, and each flange element from among the plurality of flange elements being further configured to direct other portions of the light toward a lens from among the plurality of lenses.

Concept 19. The light refraction illumination device of Concept 13, further comprising or including:
 a power source associated with the light source, the power source configured to provide the light source with an amount of energy so as to enable the light source to produce the light.

Concept 20. The light refraction illumination device of Concept 13, wherein the light source comprises or includes a light emitting diode (LED) configured to emit the light.

Concept 21. The light refraction illumination device of Concept 13, wherein at least one lens from among the plurality of lenses comprises or includes a material selected from among a group of materials consisting essentially of plastic, glass, quartz and silicon.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:
1. A light refraction illumination device comprising:
 a support member;
 a plurality of lenses associated with said support member, said plurality of lenses including a first coupling structure having a first lens integral therewith and a second coupling structure having a second lens integral therewith, whereby said second coupling structure overlaps said first coupling structure, each lens from among said plurality of lenses comprising a plurality of concave surfaces defining each lens as biconcave type; and at least one light source associated with said support member, said at least one light source configured to emit light, and said at least one light source positioned relative to said plurality of lenses such that said light travels through said first lens and said second lens in series;

wherein: said plurality of lenses are positioned along an axis of illumination associated with an initial direction of propagation of light emitted by said at least one light source such that said plurality of lenses are configured to refract a portion of said light away from said axis of illumination in response to said light traveling through said plurality of concave surfaces; and vector directions of beams of said light exiting said first and second lenses are associated with a virtual focal point of said first and second lenses respectively.

2. The light refraction illumination device of claim 1, wherein said plurality of lenses are configured in accordance with a geometric factor such that said plurality of lenses are configured to increase an even distribution of said light within a beam pattern associated with said light in response to said light traveling through said plurality of concave surfaces.

3. The light refraction illumination device of claim 2, wherein said geometric factor is selected from among a group of geometric factors consisting essentially of a surface geometry, a thickness distribution, a material density, and a degree of concavity.

4. The light refraction illumination device of claim 1, further comprising:

a power source associated with said at least one light source, said power source configured to provide said at least one light source with an amount of energy so as to enable said at least one light source to produce said light.

5. The light refraction illumination device of claim 1, wherein said at least one light source comprises a light emitting diode (LED) configured to emit said light.

6. The light refraction illumination device of claim 1, wherein at least one lens from among said plurality of lenses comprises a material selected from among a group of materials consisting essentially of plastic, glass, quartz and silicon.

7. A light refraction illumination device comprising:

a support member;

a first coupling structure associated with said support member and having a first array of lenses integral therewith, each lens from among said first array of lenses comprising a plurality of concave surfaces defining each lens as biconcave type;

a second coupling structure associated with said support member and having a second array of lenses integral therewith, each lens from among said second array of lenses comprising a plurality of concave surfaces defining each lens as biconcave type, whereby said second coupling structure overlaps said first coupling structure; and an array of light sources associated with said support member, said array of light sources configured to emit light, and said array of light sources positioned relative to said first and second arrays of lenses such that said light travels through said second array of lenses after travelling through said first array of lenses;

wherein:

said first and second arrays of lenses are positioned relative to said array of light sources such that said first and second arrays of lenses are configured to widen a beam pattern associated with said light in response to said light traveling through said first and second arrays of lenses; and vector directions of beams of the light exiting said first and second arrays of lenses are associated with virtual focal points of lenses in said first and second arrays of lenses respectively.

8. The light refraction illumination device of claim 7, wherein said first and second arrays of lenses are positioned relative to said array of light sources such that said first and second arrays of lenses are configured to increase an even distribution of said light within said beam pattern in response to said light traveling through said plurality of concave surfaces.

9. The light refraction illumination device of claim 8, further comprising:

another array of lenses associated with said support member, each lens from among said another array of lenses comprising at least one light refracting surface such that a plurality of light refracting surfaces are associated with said another array of lenses.

10. The light refraction illumination device of claim 9, wherein said another array of lenses is positioned relative to said array of light sources such that said light is configured to travel through said plurality of light refracting surfaces after traveling through said plurality of concave surfaces, and such that said another array of lenses is configured to further increase said even distribution in response to said light traveling through said plurality of light refracting surfaces.

11. The light refraction illumination device of claim 7, further comprising:

a plurality of reflectors associated with said support member, said plurality of reflectors configured to reflect an amount of said light in a direction toward said array of lenses.

12. The light refraction illumination device of claim 7, further comprising:

a plurality of flange elements associated with said first and second arrays of lenses, said plurality of flange elements configured to allow portions of said light to travel through said plurality of flange elements, and each flange element from among said plurality of flange elements being further configured to direct other portions of said light toward a lens from among said first and second arrays of lenses.

13. The light refraction illumination device of claim 7, wherein said array of light sources comprises a plurality of light emitting diodes (LEDs) configured to emit said light.

* * * * *